United States Patent [19]

Sanders

[11] 4,213,624
[45] Jul. 22, 1980

[54] PALLET TRANSPORT SYSTEM

[75] Inventor: Ralph K. Sanders, Placentia, Calif.

[73] Assignee: General Dynamics Corporation Pomona Division, Pomona, Calif.

[21] Appl. No.: 939,626

[22] Filed: Sep. 5, 1978

[51] Int. Cl.² ............................................. B62D 21/18
[52] U.S. Cl. ............................... 280/43.12; 280/43.17
[58] Field of Search .................... 280/43, 43.11, 43.12, 280/43.17, 43.2, 43.21

[56] References Cited

U.S. PATENT DOCUMENTS

| | | | |
|---|---|---|---|
| 459,365 | 9/1891 | Linden | 280/43.2 X |
| 1,973,098 | 9/1934 | Pride | 280/43.12 X |
| 2,251,567 | 8/1941 | Gould et al. | 280/79.1 R X |
| 2,446,518 | 8/1948 | Arnold et al. | 280/43 |
| 2,487,508 | 11/1949 | Anderson | 280/43.11 |
| 2,572,348 | 10/1951 | Johnson | 280/43.12 X |
| 2,594,426 | 4/1952 | Grenda | 280/43.2 |
| 2,621,941 | 12/1952 | Neumayr | 280/43.2 X |
| 2,774,609 | 12/1956 | Winger | 280/79.1 R |
| 2,877,981 | 3/1959 | McMurry, Sr. | 280/43.24 |
| 2,917,317 | 12/1959 | Denholm | 280/43.24 |
| 3,188,107 | 6/1965 | Quayle | 280/43.12 X |
| 3,213,993 | 10/1965 | Long | 280/43.17 |
| 3,246,908 | 4/1966 | Marvin | 280/29 |
| 3,633,774 | 1/1972 | Lee | 214/152 |
| 4,105,218 | 8/1978 | Newell | 280/43.12 |

*Primary Examiner*—Robert R. Song
*Assistant Examiner*—Michael Mar
*Attorney, Agent, or Firm*—Henry M. Bissell; Edward B. Johnson

[57] ABSTRACT

Apparatus easily engageable to a standard pallet or skid of the type commonly utilized in the storage and shipment of bulk items and quantities. A plurality of adaptable wheel dollies, each having a fixed support member to engage the interior of the pallet may be arrayed at the corners of the pallet. Dolly adjustment devices enable each dolly, when engaged to a pallet lying flush upon a flat surface, to raise the pallet for transport by means of the wheels of the dolly. An A-frame tongue is engageable to a pair of dollies to join the pallet transport system to tow the system.

14 Claims, 2 Drawing Figures

PALLET TRANSPORT SYSTEM

The invention described herein was made in the course of or under a contract or subcontract thereunder with the U.S. Department of the Navy.

BACKGROUND OF THE INVENTION

1. Field of the Invention

This invention relates to means for facilitating the transfer of large bulk items and loads and, in particular, a means which may be simply and removably adapted to a pallet, skid or the like upon which said items are commonly stored or placed for transport.

2. Description of the Prior Art

Present day warehousing and related storage of bulk items and loads commonly involves the placement of such upon a substantially flat platform for later transport. Such platforms are commonly denominated "shipping skids" or "pallets". Often it is desired to transport items only a short distance, to rearrange a warehouse's storage area or to move goods from storage to a loading dock or the like. A long distance journey on a truck, train, airplane, boat or combination therefore, may ensue in which the items remain unitized upon the original pallet. The utility of such a platform lies in its ability to unify a multitude of items, such as cartons, into a coherent, although bulky mass. Such a mass may be handled efficiently with the aid of standard transport equipment, such as fork lifts, where an unwieldy number of smaller units requires excessive man-hours of handling and, hence, excessive cost.

Another advantage of the use of such pallets lies in their generally standardized construction and design. An otherwise awkwardly shaped bulk item, when fixed to a pallet, gains a standardized base by which the pallet may be handled and transported.

Apparatus primarily utilized for the present-day transport of pallets and attached items include the well-known fork lift truck. These are small factory-based trucks with protruding lifting arms or forks at the front. The forks may engage a pallet with articles thereon to elevate the pallet from floor level and move the pallet with its load of articles thereon from one warehouse location to another. Often, the limited warehouse space availability makes the use of a fork lift truck disadvantageous. Like an ordinary powered wheeled vehicle, such a truck has a limited turning radius. Additionally, the fork lift mechanism, which makes the attached pallet an extension of the truck, exacerbates the warehouse's shortage of handling space. The frame of the truck absorbs additional warehouse floor space. Finally, a fork lift truck is often severely limited in the extend of load and size of pallet it can handle due to the stresses induced in its (cantilevered) protruding tongue portion.

A number of attempts have been made to design an efficient means for coping with the transport of heavy items normally stored within warehouses upon pallets or shipping skids. Included in these efforts have been a number of attempts to support the pallet by its corners, utilizing wheeled means. Such an apparatus makes more efficient use of the floor space of the warehouse than a fork lift truck and has the capability of handling larger loads than such a truck. The Johnson U.S. Pat. No. 2,572,348 shows a specially designed, portable pallet equipped with casters. The casters may be moved from a rest position, (pallet lying upon the ground) to a transport position (pallet raised above the floor, casters the sole contact with the floor) to allow the pallet to assume support and transport configurations. Additionally, each of the wheel or caster assemblies may be removed. However, the apparatus of Johnson may only be utilized in conjunction with his pallet of a special construction which includes such non-standard features as a plate-like mounting means for adapting the casters to the pallet.

Other patents which, like the Johnson patent, depend upon means for pivoting casters or wheels which are integrally attached to the support platform so as to raise or lower the platform relative to the ground or floor are disclosed in U.S. Pat. No. 459,365 of Linden and U.S. Pat. No. 2,446,518 of Arnold et al. Like the Johnson patent, these patents also disclose specially constructed, load supporting platforms. Similarly, the Pride U.S. Pat. No. 1,973,098 discloses a substitute for the conventional carrying skid commonly employed for loads requiring basal support. The Lee U.S. Pat. No. 3,633,774 discloses a load platform or sled with two sets of removable canister wheels for transporting. However, the system disclosed therein also requires a special lifting lever to raise the sled before the caster wheels can be inserted.

Systems incorporating self-contained, integrally constructed wheels are disclosed in the McMurry U.S. Pat. No. 2,877,981, the Denholm U.S. Pat. No. 2,917,317, the Long U.S. Pat. No. 3,213,993 and the Winger U.S. Pat. No. 2,774,609. The inclusion of transport wheels as integral components in a load support element undesirably increases the cost of that element and it is generally preferred to utilize low cost, conventional skids as load platform without integral wheel units.

The Neumayr U.S. Pat. No. 2,621,941 and the Anderson U.S. Pat. No. 2,487,508 both disclose load supporting structures mounted for transport on wheels or casters in which are incorporated hydraulic lifting mechanisms for raising or lowering the platform base relative to the wheels or the frame in which the wheels are mounted. However, again these load supporting apparatus are specially constructed arrangements which are not adapted, nor are they intended, for use in the manner of conventional shipping skids or pallets.

It is desirable to have a system which utilizes standard, conventional skids or pallets with arrangements for readily affixing or coupling wheels or casters thereto in a manner which thereafter permits the relative elevation of the skids with respect to the wheels so that the system thereafter may be transported on the wheels, and subsequently lowered at the point of destination so that the wheels may be readily removed and utilized in conjunction with another load-bearing skid or pallet.

SUMMARY OF THE INVENTION

In brief, particular apparatus in accordance with the present invention utilizes a plurality of adaptable wheel dollies which may be engaged to a standard pallet adjacent its corners. Each dolly has a fixed support member to engage the pallet or skid within a channel customarily provided in the conventional pallet or skid. The dollies each have elevation adjustment means so that the fixed support member can engage the pallet while the pallet is flat on the ground and can be adjusted to elevate the pallet to a raised position for lateral transport.

Various types of elevation adjustment means may be utilized in accordance with the present invention. In one particular arrangement, a worm gear-and-crank conbination is provided for each individual wheel dolly so that the elevation of the associated support member relative to the wheel of the dolly may be adjusted manually, despite the heavy loads for which the device is specifically designed. In another particular arrangement in accordance with the present invention, hydraulic lift mechanisms are provided for each individual wheel dolly for individually adjusting the elevation of the associated support member relative to the wheel thereof. In another alternative embodiment, individual electric motor driven elevating mechanisms are employed for varying the elevation of the dolly support member relative to the associated wheel. In both of the latter alternative arrangements, an associated control unit, which may be centrally or remotely positioned relative to the wheel dollies, may be intercoupled with the hydraulic or electrically driven elevation mechanisms for controlling the raising and lowering of the individual wheel dollies, either separately or in unison, as desired.

The adaptable wheel dollies of the present invention are welded mechanical assemblies, used as individual raising and lowering devices for each of the four corner portions of a heavy, metal-welded vibration and shipping platform, supporting a multiple-ton defense system. Arrangements in accordance with the present invention were specifically developed to fill a need relating to the transporting of the United States Navy Phalanx Close-In Weapon System. The Phalanx is an integral, total weapon system having a 20mm gun assembly utilizing a plurality of gun barrels rotating in Gatling gun fashion. Aiming of the guns through 320° of azimuth and 90° of elevation is controlled by an associated fire control radar/servo assembly which contains both search and tracking radar sub-systems. The radar assembly is mounted atop the gun assembly for movement therewith, and both are mounted on a gun mount and train drive assembly. The total weapon system is contained in a unitized, modular structure, which permits fast, low-cost installation on a wide variety of ships, mobile trucks, air strips, flatcars, etc.

However, being a complete, integral system having the various components already enumerated, together with associated power supplies and control systems, the Phalanx unit as constructed is extremely heavy, weighing in excess of six tons. The weapon system is fabricated in a high technology equipment manufacturing plant which is not of the classical heavy manufacturing type. Thus, when it is necessary to move a finished weapon system out of the plant for shipment, the conventional fork lifts, although of the structural configuration which is suitable for coupling into the shipping pallet of the system, simply do not have the load lifting capacity. Until the present invention was developed, it thus became necessary to rent an extremely heavy duty fork lift having the load lifting capability. This undesirably increases the expense associated with moving the finished Phalanx weapon system to the shipping dock or the like. Moreover, because of the substantial size of the system, the additional bulk of the heavy duty fork lift makes the overall package extremely difficult to maneuver in the limited spaces available in the manufacturing facility.

By using the adaptable wheel dollies in accordance with the present invention, each individual dolly is inserted into existing fork lift openings within the vibration/shipping platform or pallet so that only the wheel portion of the dolly extends forward or aft outside the pallet. Each individual dolly is then raised by the use of the elevating mechanism. An A-frame tongue may be attached to the two lead dollies by insertable pivot pins and an industrial tow-motor may then be coupled to pull, turn or back the system as a solid transportation bed at the desired height. The tongue may be attached to wheel dollies at either end of the pallet, depending upon the need or direction desired for travel.

BRIEF DESCRIPTION OF THE DRAWING

A better understanding of the present invention may be had from a consideration of the following detailed description, taken in conjunction with the accompanying drawing, in which.

DESCRIPTION OF THE PREFERRED EMBODIMENT

Figure 1:
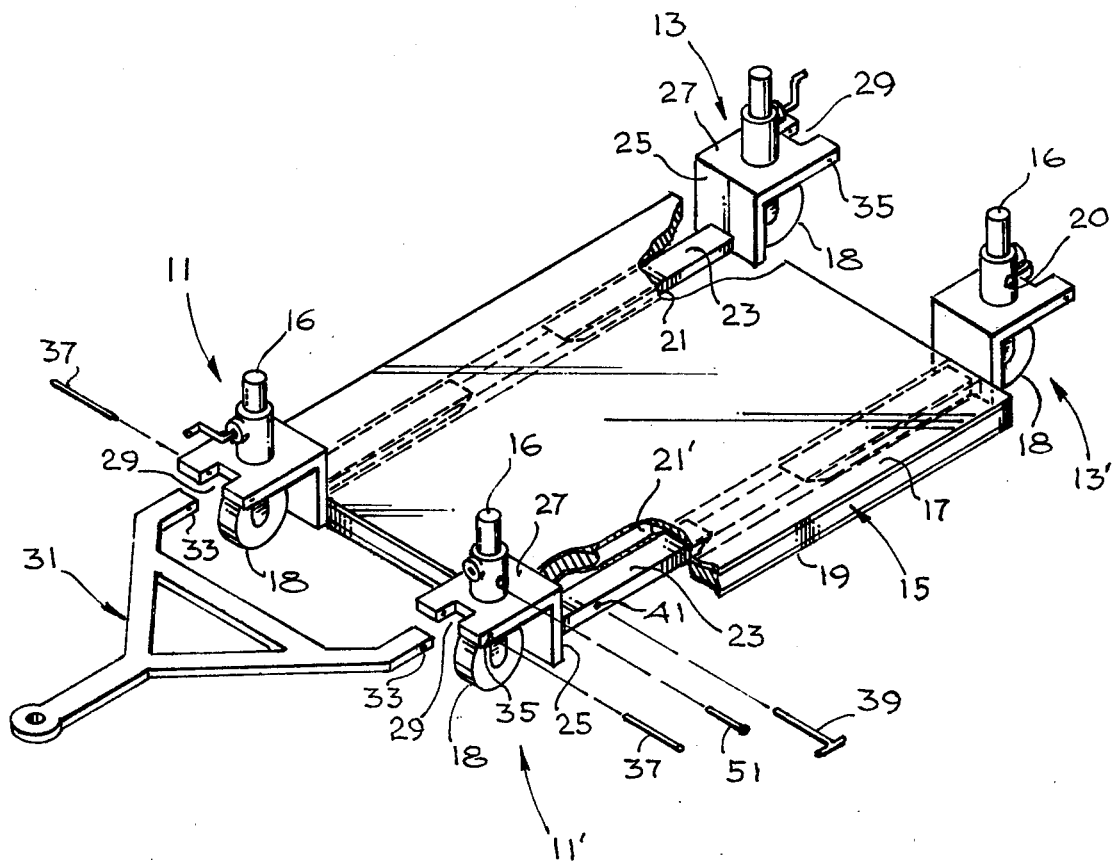
FIG. 1 is a perspective view of the present invention as adapted to engage a standard pallet or shipping skid.

Turning now to the drawing, there is shown in FIG. 1 a perspective view of the preferred embodiment of a pallet transport system of the present invention comprising adjustable wheel dollies 11, 11', 13, and 13', as engaged to a pallet or shipping skid 15. Wheel struts 16 support the dollies on wheels 18. The forward struts 16 of dollies 11, 11' are pivotable through 360° for steering. The struts 16 of rear dollies 13, 13' are also pivotable if desired but are preferably pinned against rotation by pins such as 20, during towing or movement.

The pallet or shipping skid 15 is seen to comprise an essentially flat surface upon which a heavy bulky item or a large volume of items may be placed for unitized storage and shipment. The pallet 15 has a generally uniform depth representing the separation of its upper surface 17 from its lower surface 19. Such separation may be maintained by a variety of partitioning devices such as "sills". Separation of upper surface 17 from lower surface 19 provides a plurality of hollow openings within the pallet 15. In the skid or pallet 15 illustrated in FIG. 1, such openings are shown as a pair of channels or insert enevelopes 21, 21'. Such channels or similar spaces are conventional in generally-used shipping skids, pallets or "flats".

A fixed support member 23 may be seen attached to the vertical face 25 of each dollies 11, 11' (forward dollies) and 13, 13' (rear dollies). Each vertical face 25 is seen in turn to be rigidly engaged to dolly upper plane 27. Each dolly thus provides a vertically offset, cantilevered support member such as 23 which is underslung relative to the pallet 15. The upper plane 27 has a notch 29 at its cantilevered end. The notch 29 exists in both the forward dollies 11, 11' and rear dollies 13, 13'. It allows the user to insert A-frame tongue 31 which, in turn, may be joined to an industrial towmotor, for example, to power the movement of the load on the pallet or shipping skid 15. A simple engagement is provided by the use of matching tongue pin holes 33 and dolly pin holes 35. The pivotable engagement of the A-frame tongue 31 to the dollies 11, 11' is secured by the insertion of attachment pins 37. It is to be noted that the tongue 31 may be adapted to either the forward dollies 11, 11' or the rear dollies 13, 13' in equivalent fashion. The desired direction of transport will dictate such engagement.

Other simple pin and slot arrangements may be utilized in securing the fixed support members 23 to the shipping skid 15. This is accomplished by the pins 39 which engage the holes 41 within fixed support member 23 to lock the fixed support member 23 to a matching hole (not shown) in the side of insert envelope 21 or 21'.

Figure 2:
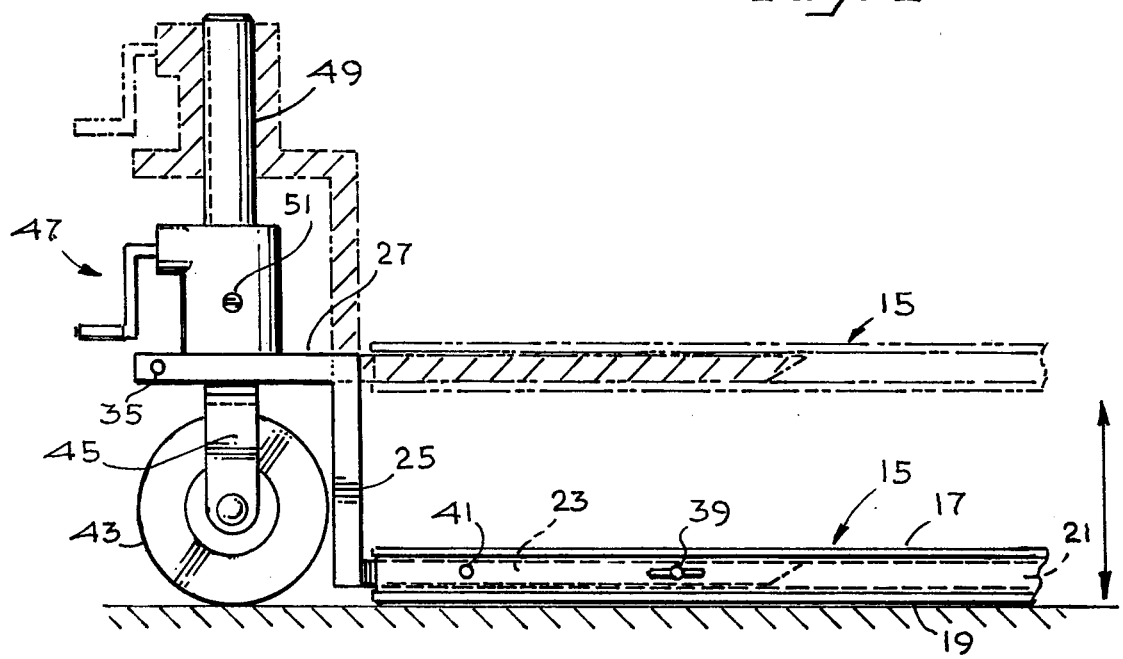
FIG. 2 is a side view of an adjustable dolly according to the present invention illustrating both its raised and floor positions.

FIG. 2 illustrates a side view in detail of an individual wheel dolly of the present invention. In addition to the S-shaped frame comprising the fixed support member 23 engaged to vertical face 25, which in turn is engaged to upper plate 27, the wheel dolly is seen to have a wheel 43 rotatable upon forked frame 45. The wheel 43 is freely rotating and not engaged to any mechanical motor or gearing. Elevation adjustment means 47 sits atop upper plane 27. The elevation adjustment means may be any of a number of common mechanical, pneumatic or hydraulic actuated mechanisms. This mechanism enables the elevation adjustment means 47 to travel the height of protruding shaft 49, thereby pulling the rigidly engaged S-shaped frame of the dolly in conjunction therewith. By such movement, it is seen that fixed support member 23 and, consequently, the pallet or shipping skid 15 engaged thereto, is caused to be raised or lowered in response to the action of the elevation adjustment means 47. Such movement allows the user to engage the dolly to the pallet 15 while the pallet is lying flat upon the ground. For purposes of shipment or transport, the pallet is then raised to the position indicated with cross-hatching in FIG. 2. In such position only the wheel 43 of the dolly contacts the ground. Transport may now ensue with, perhaps, the assistance of a motorized device engaged to the unit by means of an A-frame tongue 31.

A swivel adjustment pin 51 engages each wheel dolly at elevation adjustment means 47. By the insertion of the pin 51, the swivel (horizontal plane) movement of the forked frame 45 and hence the attached wheel 43 of each dolly is restrained. With no pin 51 in place, each wheel 43 may rotate through 360° to allow extreme steering tolerance for the unit comprising dollies 11, 11', 13, 13' and pallet 15. Thus, a variety of transport modes may be selected depending upon the space maneuverability requirement of the particular task and confining space. For movement up a narrow row of stacked pallets it may be desirable to lock all four wheels to assure that the pallet will not "wander". A very small turning radius may be achieved by removal of the pins 51 from all dollies. Alternatively, it may be desirable to fix the trailing wheels and leave the forward wheels free for rotation, a standard guiding and trailing wheel configuration.

Although there has been described hereinabove specific apparatus of pallet transport means in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the appended claims.

What is claimed is:

1. An adaptable wheel dolly attachable with a plurality of like wheel dollies to a shipping skid for lifting and transporting said skid comprising:
   a frame;
   a wheel and axle;
   a strut member coupled to the axle and pivotably mounting the wheel to a first portion of the frame positioned over the wheel;
   means coupled to the strut member and the frame for elevating the frame relative to the strut member and wheel between a lowered position suitable for engaging a shipping skid and a selected elevated position for lifting said skid;
   a second portion of the frame angled downwardly from the first portion and extending to a level adjacent the bottom
   an elongated cantilevered support member shaped to fit within a fork lift envelope of a standard shipping skid, the support member being rigidly attached at its proximal end to the second portion of the frame adjacent its lower end and means for locking the support member to the shipping skid comprising at least one pin for engaging matching holes in the support member and in the fork lift envelope of the shipping skid.

2. The wheel dolly of claim 1 wherein said frame comprises an upper planar, generally horizontal portion rigidly attached to a generally vertical planar portion, said vertical portion being rigidly affixed to the support member.

3. The wheel dolly of claim 2 wherein the upper planar portion has an edge remote from the juncture with the vertical portion, said edge being configured to receive the end of a towing tongue.

4. The wheel dolly of claim 3 further including means for pivotably securing said tongue to said upper planar portion adjacent said edge.

5. The wheel dolly of claim 4 wherein the end of said towing tongue is in the form of a bar and wherein said edge is configured with a notch shaped to receive said bar.

6. The wheel dolly of claim 5 wherein the securing means comprises a pin and generally aligned holes in the bar and the upper planar portion respectively adjacent the edge, said pin being insertable through said holes to engage the bar so as to permit the tongue to pivot relative to the wheel dolly frame about a horizontal axis.

7. The wheel dolly of claim 1 wherein the strut member is mounted in a vertical attitude for pivoting with the wheel about a vertical axis.

8. The wheel dolly of claim 7 further comprising means for locking the strut member relative to the frame to prevent pivoting of the wheel about the axis of the strut member.

9. The wheel dolly of claim 1 wherein the elevating means comprises a manually operable crank for adjusting the elevation of the frame relative to the strut member.

10. The wheel dolly of claim 1 wherein the elevating means includes a cylindrical member affixed to the frame and encircling the strut member for bearing against the strut member to selectively adjust the elevation of the frame relative to the strut member and wheel.

11. A pallet transport system comprising:
   a standard shipping skid having at least two opposed, generally parallel, fork lift envelopes extending substantially through the skid from one end to the other and being located respectively adjacent opposite sides of the skid; and
   four adaptable wheel dollies for attachment to the skid by insertion of respective support members into opposite ends of the respective fork lift envelopes for lifting and transporting the skid, each of the wheel dollies comprising:
a frame;
a wheel and axle;
a strut member coupled to the axle and pivotably mounting the wheel to a first portion of the frame positioned over the wheel;
means coupled to the strut member and the frame for elevating the frame relative to the strut member and wheel between a lowered position suitable for engaging the shipping skid and a selected elevated position for lifting said skid;
a second portion of the frame angled downwardly from the first portion and extending to a level adjacent the bottom
an elongated cantilevered support member shaped to fit within a fork lift envelope of the skid, the support member being rigidly attached at its proximal end to the second portion of the frame adjacent its lower end and means for locking the support member to the shipping skid comprising at least one pin for engaging matching holes in the support member and in the fork lift envelope of the shipping skid.

12. The pallet transport system of claim 11 wherein at least two of the wheel dollies have an edge of the first portion of the frame remote from the juncture with the second portion, which edges are configured to receive the ends of an A-frame towing tongue.

13. The pallet transport system of claim 12 further including means for pivotably securing said tongue to said wheel dolly edges for towing the skid.

14. The pallet transport system of claim 13 further including means for locking the strut members relative to the frames of those dollies remote from the dollies coupled to the towing tongue in order to prevent pivoting of the wheels of the locked dollies about the axes of their strut members.

* * * * *